United States Patent [19]
Tamano et al.

[11] Patent Number: 5,968,675
[45] Date of Patent: Oct. 19, 1999

[54] HOLE-TRANSPORTING MATERIAL AND USE THEREOF

[75] Inventors: Michiko Tamano; Satoshi Okutsu; Toshio Enokida, all of Tokyo, Japan

[73] Assignee: Toyo Ink Manufacturing Co., Ltd., Tokyo, Japan

[21] Appl. No.: 09/085,251

[22] Filed: May 28, 1998

Related U.S. Application Data

[63] Continuation-in-part of application No. 08/762,921, Dec. 10, 1996, abandoned.

[30] Foreign Application Priority Data

Dec. 11, 1995 [JP] Japan ..................................... 7-321345
Nov. 18, 1996 [JP] Japan ..................................... 8-306049

[51] Int. Cl.$^6$ ................................................. H05B 33/14
[52] U.S. Cl. ........................ 428/690; 428/917; 428/691; 313/504
[58] Field of Search ............................. 313/504; 428/690, 428/917, 691

[56] References Cited

U.S. PATENT DOCUMENTS 5,674,597  10/1997  Fujii et al. ............................... 428/690

FOREIGN PATENT DOCUMENTS

| 0 508 562 | 10/1992 | European Pat. Off. . |
| 0 517 542 | 12/1992 | European Pat. Off. . |
| 0 562 883 | 9/1993  | European Pat. Off. . |
| 0 611 148 | 8/1994  | European Pat. Off. . |
| 0 650 955 | 5/1995  | European Pat. Off. . |
| 0 731 625 | 9/1996  | European Pat. Off. . |
| 7-0096499 | 11/1995 | Japan . |

OTHER PUBLICATIONS

Bando Chem. Ind. Ltd., Database WPI, Nov. 1996, Abstract.

*Primary Examiner*—Charles Nold
*Attorney, Agent, or Firm*—Wenderoth, Lind & Ponack, L.L.P.

[57] ABSTRACT

A hole-transporting material having excellent hole transportation capability and sufficient durability, used in an organic EL device and an electrophotographic photoreceptor, the hole-transporting material having the general formula specified in claim 1.

9 Claims, 1 Drawing Sheet

HOLE-TRANSPORTING MATERIAL AND USE THEREOF

This application is a continuation-in-part of now abandoned application Ser. No. 08/762,921, abandoned, filed on Dec. 10, 1996.

FIELD OF THE INVENTION

The present invention relates to a hole-transporting material having a triphenylamine structure, which can be used as a photosensitive material and an organic photoconductive material. More specifically, the present invention relates to a hole-transporting material having a triphenylamine structure, which can be used as a hole-transporting material for an organic electroluminescence (EL) device used as a flat light source or a flat display, or for an electrophotographic photoreceptor.

PRIOR ART OF THE INVENTION

Organic photoconductive materials developed as a photosensitive material and a hole-transporting material have many advantages in that they are inexpensive, processable in various ways and free of pollution, and many compounds have been proposed as such. For example, there are disclosed oxadiazole derivatives (U.S. Pat. No. 3,189,447), oxazole derivatives (U.S. Pat. No. 3,257,203), hydrazone derivatives (U.S. Pat. No. 3,717,462, JP-A-54-59143 and U.S. Pat. No. 4,150,978), triarylpyrazoline derivatives (U.S. Pat. No. 3,820,989, JP-A-51-93224 and JP-A-55-108667), arylamine derivatives (U.S. Pat. No. 3,180,730, U.S. Pat. No. 4,232,103, JP-A-55-144250 and JP-A-56-119132) and stilbene derivatives (JP-A-58-190953 and JP-A-59-195658).

An organic EL device is one of products produced by technology using a hole-transporting material. An organic EL device formed of an organic substance is considered promising in the field of an inexpensive large-area full-color display device of a solid light-emission type, and has been and is developed in various ways. Generally, an EL device is composed of a light-emitting layer and a pair of mutually opposite electrodes sandwiching the light-emitting layer. Light emission is a phenomenon. When an electric field is applied between these two electrodes, the cathode injects electrons into the light-emitting layer, and the anode injects holes into the light-emitting layer. When the electrons recombine with the holes in the light-emitting layer, their energy level shifts to a valence bond band to release energy as light.

Conventional organic EL devices require a higher drive voltage than inorganic EL devices, and their brightness of emitted light and their light emission efficiency are also lower than those of inorganic EL devices. Further, conventional organic EL devices extremely deteriorate in characteristics, and almost no organic EL devices have been put to practical use.

In recent years, there has been proposed an organic EL device which is fabricated by laminating a thin film containing an organic compound having a high fluorescent quantum efficiency of emitting light at a low voltage as low as less than 10 V, and it attracts attention (Appl. Phy. Lett., Vol. 51, page 913, 1987).

The above organic EL device has a fluorescent layer containing a metal chelate complex and a hole-injecting layer containing an amine-based compound, and emits green light having a high brightness. The above organic EL device achieves practically almost acceptable performance, since it accomplishes a brightness of 1,000 cd/m$^2$ and a maximum light emission efficiency of 1.5 lm/W at a direct current voltage of 6 or 7 V.

An organic EL device has a light-emitting layer containing an organic fluorescent compound between a metal cathode layer and a transparent anode layer. Further, the organic EL device is formed as such by adding an electron-injecting layer and a hole-injecting layer for obtaining light emission having a high brightness at a low voltage. In the above organic EL device, excitons are generated by the recombination of electrons injected from the cathode and holes from the anode, and light is emitted in the process of the radiation and the subsequent inactivation of the excitons (JP-A-59-194393, JP-A-63-295695). However, when the light emission is continued for a long time under the application of direct current, the crystallization of the organic compound is accelerated and a leak current is liable to occur in the device so that the device is likely to be destroyed. For overcoming the above problem, therefore, the hole-transporting material used in the hole-injecting layer is selected from compounds such as 4,4',4"-tris(N,N'-diphenylamino)triphenylamine (TDATA), 4,4',4"-tris[N-(3-methylphenyl)-N-phenylamino] triphenylamine (MTDATA), or the like (JP-A-4-308688). These compounds have a twisted steric form and are hardly undergo crystallization, and they are also excellent in thin film formability. However, the above compound are not fully satisfactory. The problem is that when the device is made to emit light for long time, the device easily deteriorates.

As explained above, those organic EL devices which have been fabricated so far are not yet satisfactory in the brightness of light emission and the stability of light emission in repeated use, and there is therefore desired to develop a hole-transporting material having excellent hole-transporting capability and durability for developing an organic EL device having a large light emission brightness, having high light emission efficiency and having excellent stability in repeated use.

Further, an electrophotographic photorecptor is one of products for which a hole-transporting material is adapted. An electrophotographic method is one image-forming method that was invented by Carlson. In the electrophotographic method, an electrophotographic photorecptor is charged by corona discharging, then an electrostatic latent image is formed on the electrophotographic photoreceptor by optical exposure to an image, a toner is allowed to adhere to the electrostatic latent image to develop an image, and the so-obtained image of the toner is transferred to a receptor. The basic requirements of the electrophotographic photoreceptor used in the above electrophotographic method are that a proper potential is maintained in a dark place, that the degree of discharging of electric charge in a dark place is low, and that the electric charge is readily discharged by optical exposure. A conventional electrophotographic photoreceptor is formed of an inorganic photoconductive material such as selenium, selenium alloy, zinc oxide, cadmium sulfide or tellurium. These photoconductive materials are advantageous in that they have high durability and permits the reproduction of a large number of copies, while it is pointed out that they have defects in that the production cost increases, that their processability is poor and that they are toxic. For overcoming these defects, organic electrophotographic photoreceptors have been developed, while it cannot be necessarily said at present that electrophotographic photoreceptors for which conventional organic photoconductive materials as hole-transporting materials are adapted are satisfactory in electrophotographic characteristics such as chargeability, sensitivity and residual potential. It is therefore desired to develop a hole-transporting material having excellent charge transportation capability and excellent durability.

SUMMARY OF THE INVENTION

It is an object of the present invention to provide a hole-transporting material having excellent hole transportation capability and sufficient durability.

It is another object of the present invention to provide an organic EL device for which the hole-transporting material of the present invention is adapted and which therefore has a long life in operation and an electrophotographic photoreceptor for which the the hole-transporting material of the present invention is adapted and which therefore has excellent stability in repeated use.

According to the present invention, there is provided a hole-transporting material of the following general formula [1],

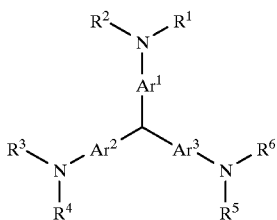

[1]

wherein each of $R^1$ to $R^6$ is an aryl group or a substituted aryl group, provided that at least one of $R^1$ to $R^6$ is an aryl group having a cycloalkyl ring or that at least one of $R^1$ to $R^6$ constitutes fused aromatic rings having not less than 3 fused rings, and each of $Ar^1$ to $Ar^3$ is an arylene group or a substituted arylene group.

According to the present invention, further, there is provided a hole-transporting material of the following general formula [2],

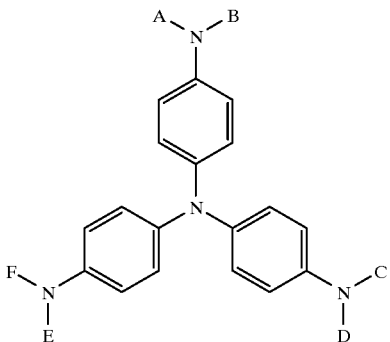

[2]

wherein each of A to F is an aromatic ring or a substituted aromatic ring provided that at least one of A to F constitutes fused aromatic rings having not less than 3 fused rings or a substituted aromatic ring having a cycloalkyl ring.

Further, according to the present invention, there is provided an organic electroluminescence device comprising a pair of electrodes and either a light-emitting layer or a plurality of organic compound thin layers which contain the light-emitting layer, formed between a pair of the electrodes.

Further, according to the present invention, there is provided an electrophotographic photoreceptor formed by applying a charge-generating material and the above hole-transporting material onto an electrically conductive substrate

DETAILED DESCRIPTION OF THE INVENTION

Figure 1:
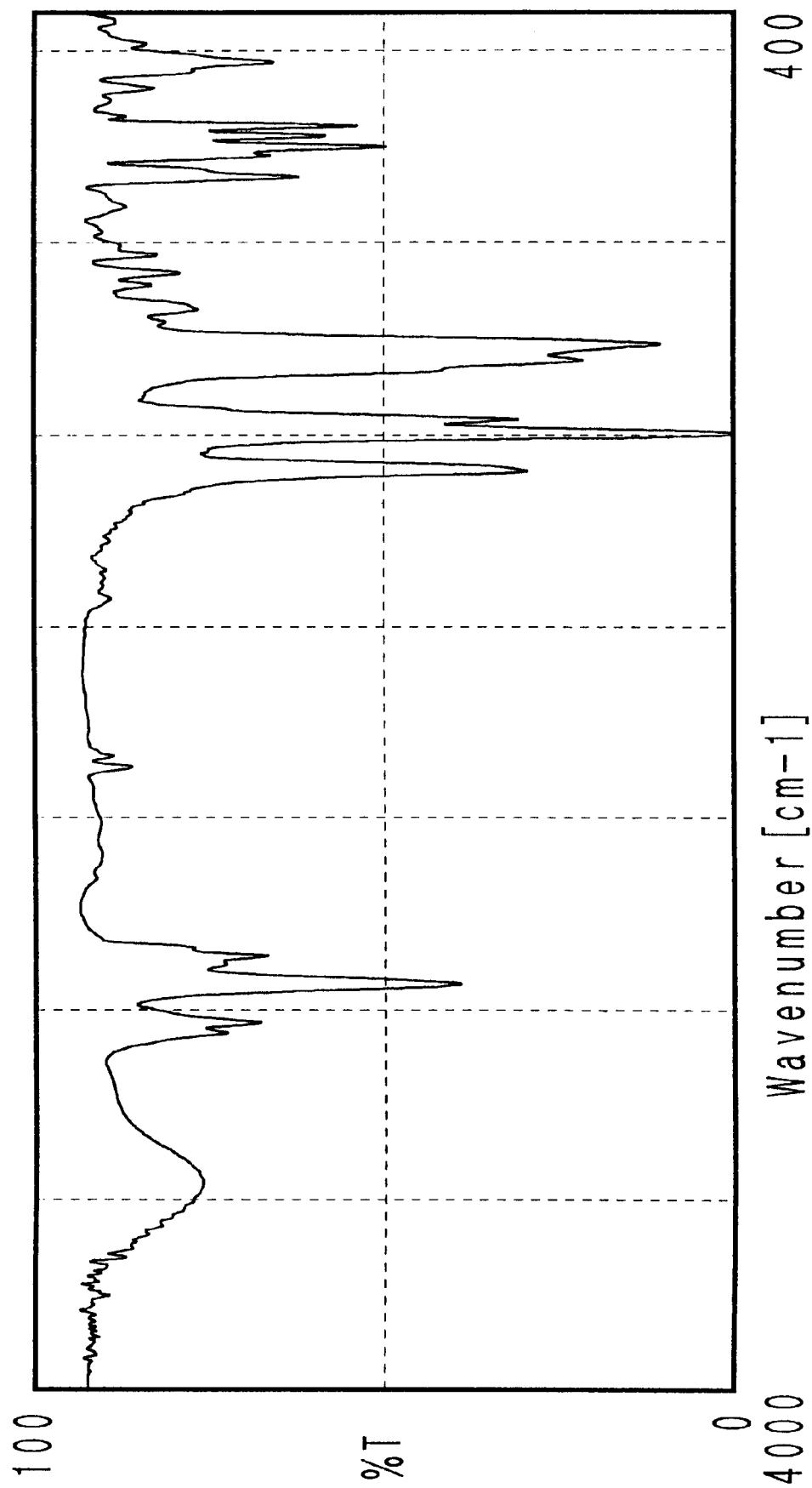
FIG. 1 is an infrared absorption spectrum of Compound (3) shown in Table 1.

The present inventors have made diligent studies and as a result have found that the hole-transporting material of the general formula [1] has the high capability of transporting electrons and that an organic EL device and an electrophotographic photoreceptor for which the hole-transporting material of the general formula [1] is adapted are excellent in device characteristics and stability in repeated use.

In the general formula [1], each of $R^1$ to $R^6$ is an aryl group or a substituted aryl group, provided that at least one of $R^1$ to $R^6$ an aryl group is an aryl group of which adjacent substituents form a cycloalkyl group or that at least one of $R^1$ to $R^6$ constitutes fused aromatic rings having not less than 3 fused rings. The aryl group includes phenyl, tolyl, naphthyl, anthranyl, phenanthlenyl, fluorenyl, acenaphthyl, azulenyl, heptanlenyl, acenaphthylenyl, pyrenyl, biphenyl, 4-ethylbiphenyl, terphenyl, quaterphenyl, benz[a]anthranyl, triphenylenyl, 2,3-benzfluorenyl and3,4-benzopyrenyl. Each of $Ar^1$ to $Ar^3$ is an arylene group, and the arylene group includes phenylene, 2-methylphenylene, naphthylene, anthranylene, phenanthrenylene, acenaphthylene, pyrenylene, biphenylene, 2,2'-dimethylbiphenylene, 3,3'-dichlorobiphenylene, terphenylene and quaterphenylene. Further, the alicyclic ring formed by adjacent substituents on the aryl group is an alicyclic ring having 4 to 8 carbon atoms, and the alicyclic ring includes cyclobutyl, cyclopentyl, cyclohexyl, cycloheptyl and cyclooctyl.

Typical examples of the substituents of the substituted aryl group as $R^1$ to $R^6$ and the substituted arylene group as $Ar^1$ to $Ar^3$ in the general formula [1] and the substituents of the substituted aromatic ring and the substituted fused aromatic rings as A to F in the general formula [2] include halogen atoms such as fluorine, chlorine, bromine and iodine; substituted or non-substituted alkyl groups such as methyl, ethyl, propyl, butyl, sec-butyl, tert-butyl, pentyl, hexyl, heptyl, octyl, stearyl, trichloromethyl, trifluoromethyl, cyclopropyl, cyclohexyl, 1,3-cyclohexadienyl, 2-cyclopenten-1-yl and 2,4-cyclopentadien-1-ylidennyl; substituted or non-substituted alkoxy groups such as methoxy, ethoxy, propoxy, n-butoxy, sec-butoxy, tert-butoxy, pentyloxy, heptyloxy and stearyloxy; substituted or non-substituted thioalkoxy groups such as methylthio, ethylthio, propylthio, butylthio, sec-butylthio, tert-butylthio, pentylthio, hexylthio, heptylthio and octylthio; mono- or disubstituted amino groups such as methylamino, dimethylamino, ethylamino, diethylamino, dipropylamino, dibutylamino, diphenylamino, bis(acetoxymethyl)amino, bis(acetoxyethyl)amino, bis(acetoxypropyl)amino and dibenzylamino; substituted or non-substituted aryloxy groups such as phenoxy, p-tert-butylphenoxy and 3-fluorophenoxy; substituted or non-substituted arylthio groups such as phenylthio and 3-fluorophenylthio; and substituted or non-substituted aryl groups such as phenyl, biphenyl, triphenyl, terphenyl, 3-nitrophenyl, 4-methylthiophenyl, 3,5-dicyanophenyl, o-, m- or p-tolyl, xylyl, o-, m- or p-cumenyl, mesityl, pentalenyl, indenyl, naphthyl, azulenyl, heptalenyl, acenaphthylenyl, phenalenyl, fluorenyl, anthryl, anthraquinolyl, 3-methylanthryl, phenathryl, triphenylenyl, pyrenyl, chrysenyl, 2-ethyl-2-chrysenyl, picenyl, perylenyl, 6-chloroperylenyl, pentaphenyl, pentacenyl, tetraphenylenyl, hexaphenyl, hexacenyl, rubicenyl, coronenyl, trinaphthylenyl, heptaphenyl, heptacenyl, pyranthrenyl and ovalenyl; substituted or non-substituted heterocyclic rings such as thienyl, furyl, pyrrolyl, imidazolyl, pyrazolyl, pyridyl, pyrazinyl, pyrimidinyl, pyridazinyl, iondolyl, quinolyl, isoquinolyl, phthalazinyl, quinoxalinyl, quinazolinyl, carbazolyl, acridinyl, phenazinyl, furfuryl, isothiazolyl, isoxazolyl, furazanyl, phenoxazinyl, benzothiazolyl, benzoxazolyl, benzimidazolyl, 2-methylpyridyl and 3-cyanopyridyl, although the substituents shall not be limited to the above groups.

Further, the above substituents which are adjacent to each other may form a 5- to 7-membered cycloalkyl, aryl or heterocyclic ring which may contain an oxygen, nitrogen or sulfur atom. Further, the above ring may have another substituent on any position. Typical examples thereof include phenyl, fluorenyl, anthryl, anthraquinonyl, 3-methylanthryl, phenanthryl, triphenylenyl, pirenyl, chrysenyl, 2-ethyl-1-chrysenyl, picenyl, perylenyl, 6-chloroperylenyl, pentaphenyl, tetraphenylenyl, hexaphenyl, hexacenyl, rubicenyl, coronenyl, trinaphthylenyl, heptaphenyl, heptacenyl, pyranthrenyl and ovalenyl. Examples of the heterocyclic ring include thonyl, furyl, pyrolyl, imidazolyl, pyrazolyl, pyridyl, pyrazinyl, pyrimidinyl, pyridazinyl, indolyl, quinolyl, isoquinolyl, phthalazinyl, quinoxalinyl, quinazolinyl, carbazolyl, acridinyl, phenazinyl, furfuryl, isothiazolyl, isoxazolyl, furazanyl, phenoxazinyl, benzothiazolyl, benzoxazolyl, benzimidazolyl, 2-methylpyridyl and 3-cyanopyridyl.

The compound of the general formula [1], provided by the present invention, can be synthesized by the following method for example. Tris (p-bromophenyl) amine is reacted with 5 to 8 mol, per mole of the tris(p-bromophenyl)amine, of a substituted aromatic diamine compound in nitrobenzene as a solvent in the presence of a catalyst such as potassium carbonate or copper at 200° C. for about 50 hours.

The following table 1 shows typical examples of the compound of the general formula [1], while the compound of the general formula [1] shall not be limited to these typical examples.

TABLE 1

Chemical structure (1)

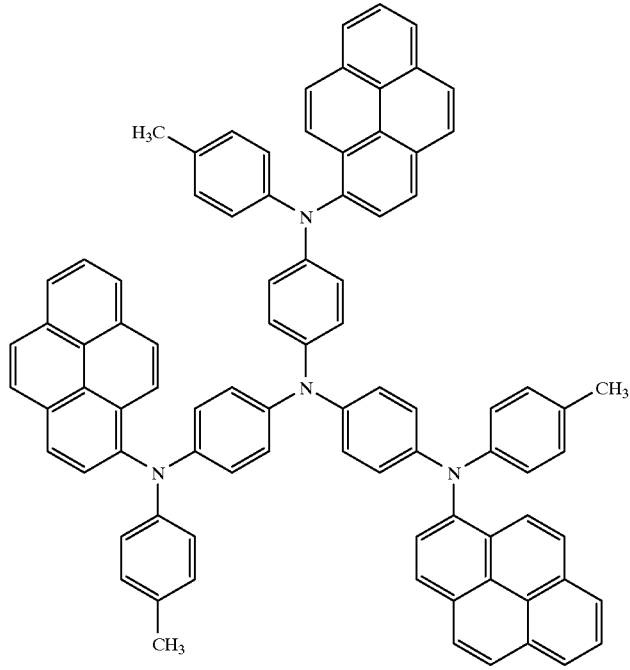

TABLE 1-continued

Chemical structure (2) [chemical structure]

(3) [chemical structure]

TABLE 1-continued
Chemical structure
(4) 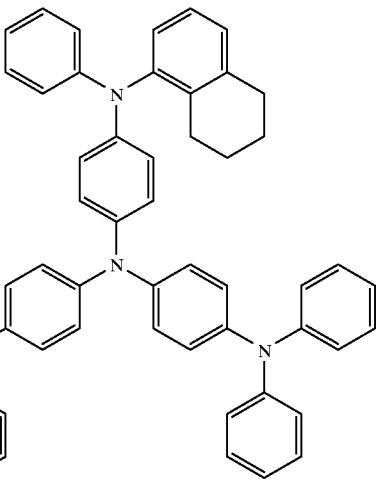
(5) 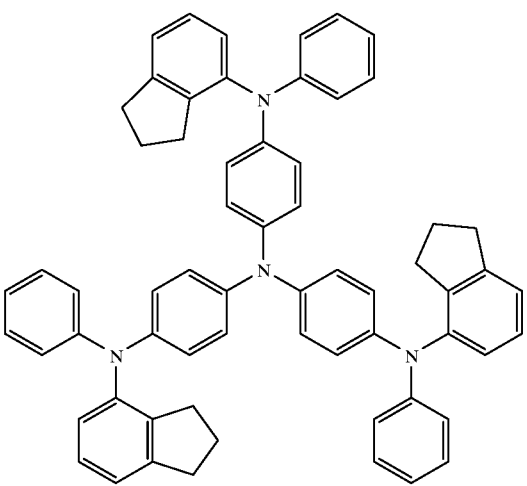
(6) 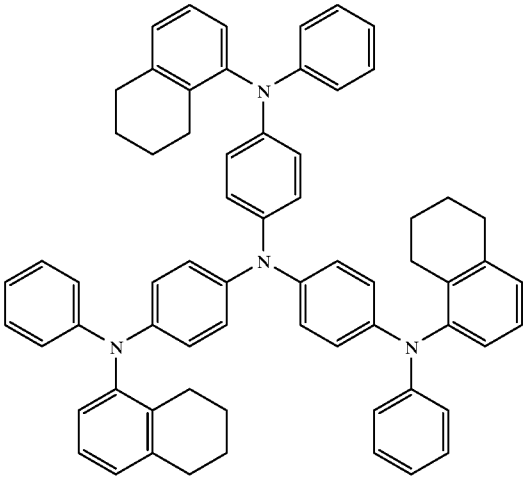

TABLE 1-continued
Chemical structure
(7)
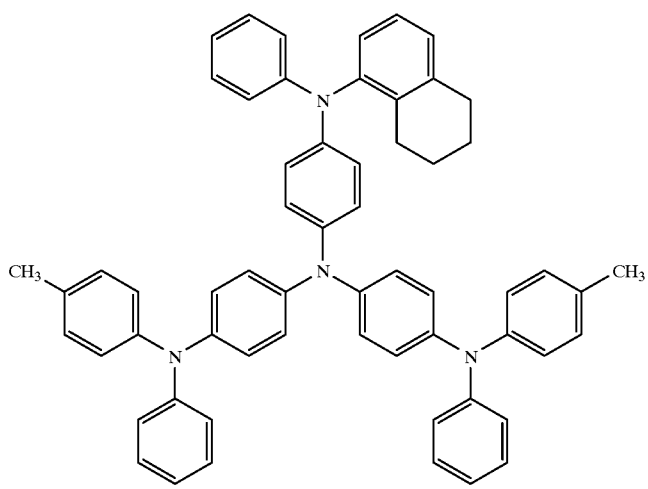
(8)
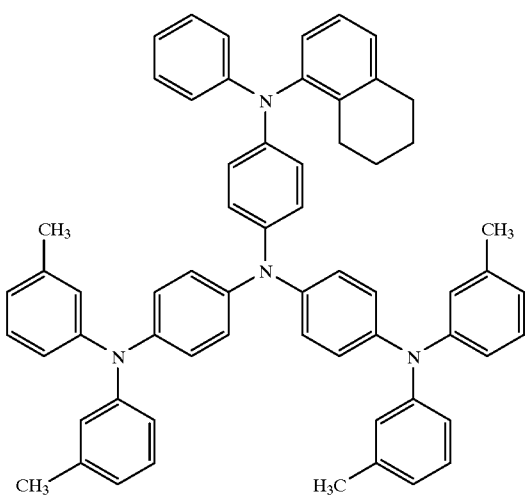
(9)
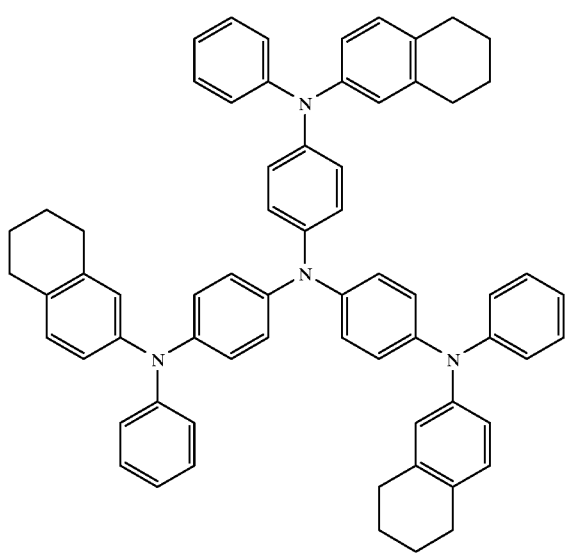

TABLE 1-continued
Chemical structure
(10)
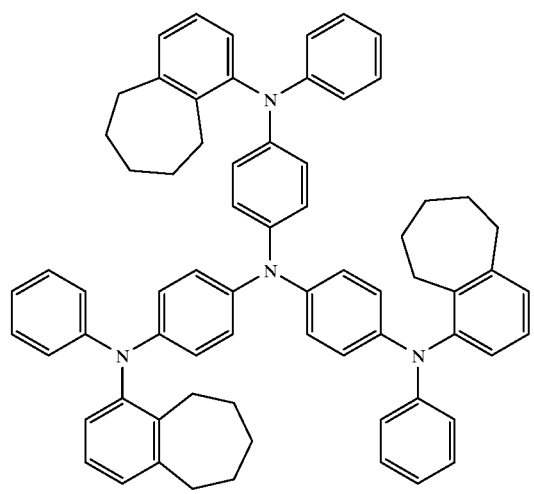
(11)
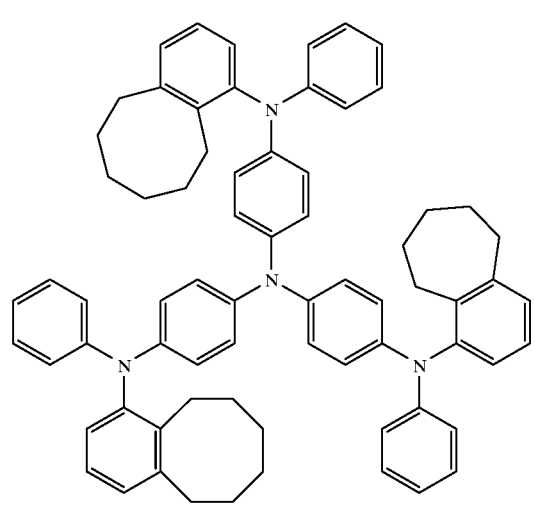
(12)
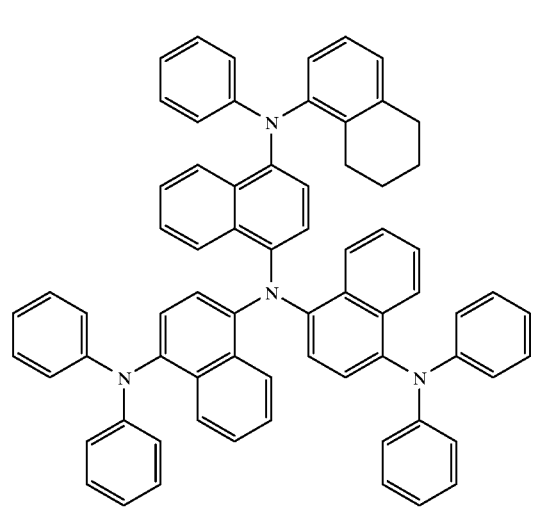

TABLE 1-continued

Chemical structure (13)

(14)

TABLE 1-continued
Chemical structure
(15)
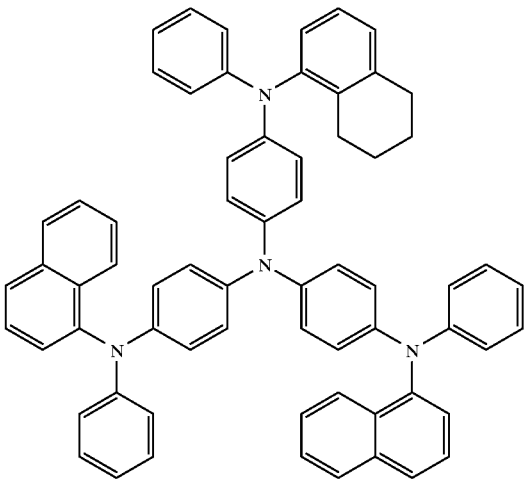
(16)
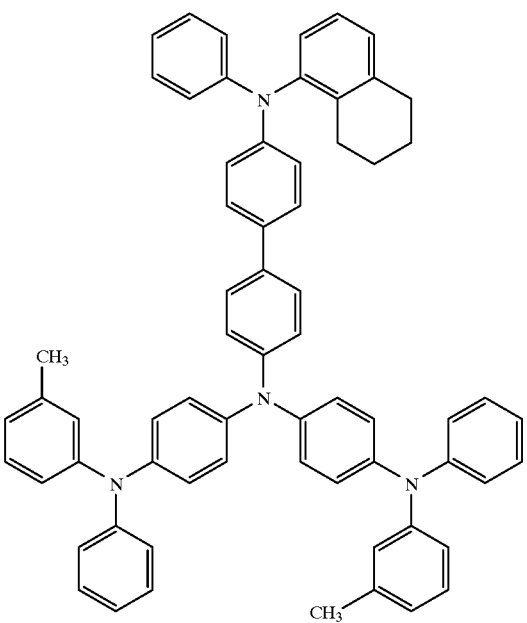

TABLE 1-continued
| Chemical structure |
|---|
(17)
(18)
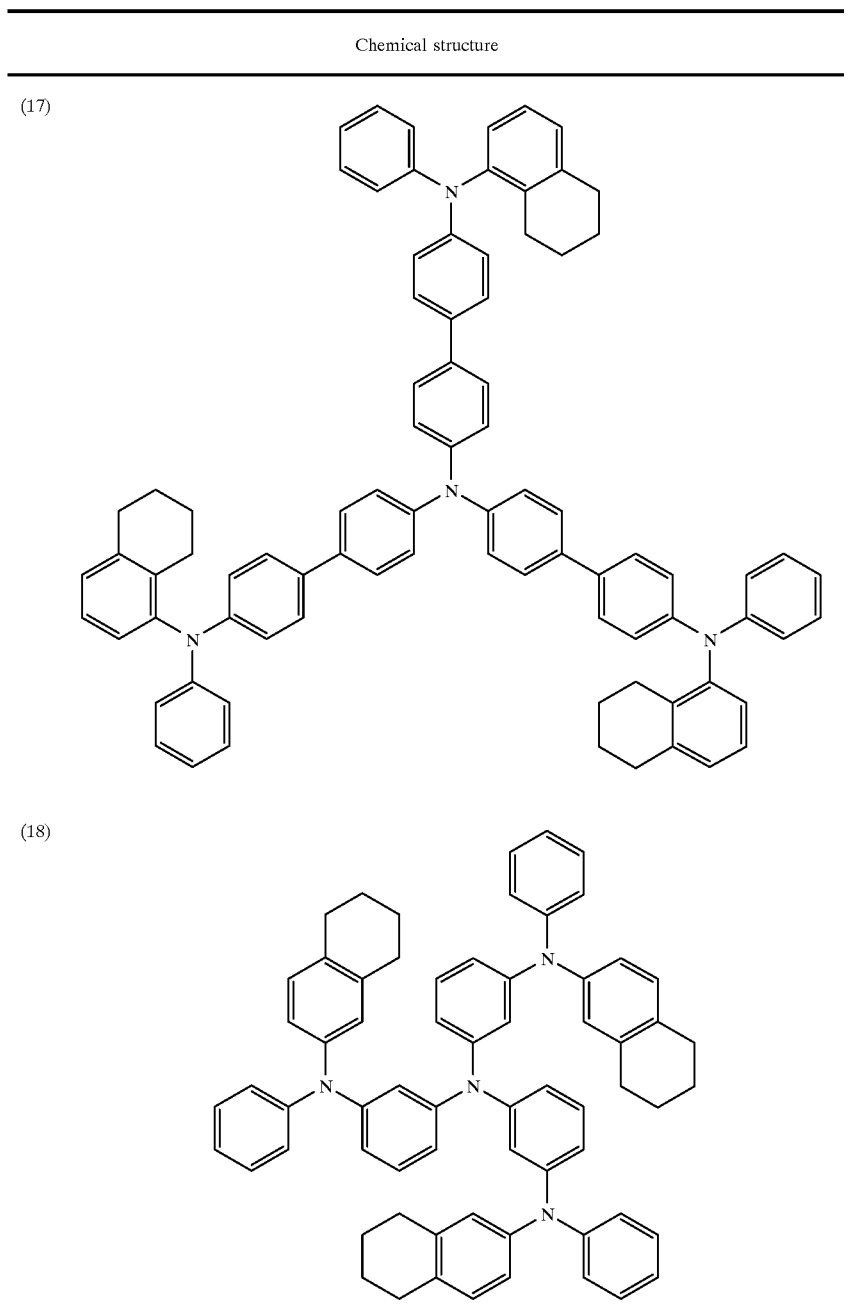

TABLE 1-continued

| Chemical structure |
|---|
| (19) |
| (20) |

TABLE 1-continued

Chemical structure (21)

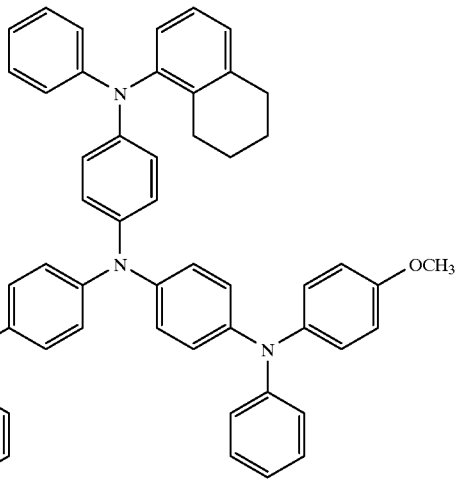

The hole-transporting material of the present invention may be used in one layer in combination with other hole-transporting material or an electron-transporting material. Being excellent in the hole-transporting capability, the hole-transporting material of the present invention can be very effectively used as such.

The organic EL device is a device in which one organic thin layer or a plurality of organic thin layers are formed between an anode and a cathode. In a monolayered device, a light-emitting layer is formed between the anode and the cathode. The light-emitting layer contains a light-emitting material, and in addition thereto, it may contain a hole-transporting material for transporting holes injected from the anode to the light-emitting material, or an electron-transporting material for transporting electrons injected from the cathode to the light-emitting material. Some light-emitting materials have the capability of transporting holes or electrons. In a multi-layered device, the organic EL device has one of layer structures, for example, of (anode/hole-injecting layer/light-emitting layer/cathode), (anode/light-emitting layer/electron-injecting layer/cathode) and (anode/hole-injecting layer/light-emitting layer/electron-injecting layer/cathode). The compound of the general formula [1] can be used in any one of the above layer structures. The compound of the general formula [1] has the high capability of transporting holes, and it can be therefore used as a hole-transporting material in any one of the hole-injecting layer and the light-emitting layer. The hole-transporting material of the present invention has the function of being implanted with holes from the anode and the function of transporting the injected holes, and it can be used in any layer even when the hole-injecting layer is formed of two or more layers. A thin layer formed of the compound of the general formula [1] is amorphous, which is advantageous for the storage of the thin layer for a long time and for the light emission life when the device is driven. Further, the compound of the general formula [1] has excellent adhesion to a metal electrode such as an ITO electrode and has a low ionization potential, so that it is advantageous in the injection of holes from the anode. When the hole-injecting layer is formed of two layers or more, therefore, it is further advantageous to use the compound of the general formula [1] in the layer located on the electrode (anode) side.

In addition to the compound of the general formula [1], the light-emitting layer may contain a light-emitting material, a dopant, a hole-transporting material for transporting a carrier and an electron-transporting material as required. When the organic EL device has a two-layer structure, the device is formed of the light-emitting layer and the hole-injecting layer. This two-layer structure improves the efficiency of injecting holes from the hole-injecting layer to the light-emitting layer, so that the light emission brightness and the light emission efficiency can be increased. For light emission in this case, preferably, the light-emitting substance used in the light-emitting layer has the capability of transporting electrons, or the light-emitting layer contains an electron-transporting material. When the organic EL device has a two-layer structure, the device is formed of the light-emitting layer and the electron-injecting layer as another layer structure. In this case, preferably, the light-emitting material itself has the capability of transporting holes, or the light-emitting layer contains a hole-transporting material.

When the organic EL device has a three-layer structure, the device is formed of the hole-injecting layer, the light-emitting layer and the electron-injecting layer, so that the efficiency of recombination of holes and electrons in the light-emitting layer is improved. The above multi-layer structure of the organic EL device can serve to prevent a quenching-induced decrease in the brightness and the device life. In the above multi-layer structure, a light-emitting material, a dopant, a hole-transporting material for transporting a carrier and an electron-transporting material may be used in combination as required. Further, each of the hole-injecting layer, the light-emitting layer and the electron-injecting layer may be formed of two layers or more.

The electrically conductive material used for the anode of the organic EL device is suitably selected from those materials having a work function of greater than 4 eV. This electrically conductive material includes carbon, aluminum, vanadium, iron, cobalt, nickel, tungsten, silver, gold, platinum, palladium, alloys of these, metal oxides such as tin oxide and indium oxide used for ITO substrates or NESA substrates, and organic electrically conductive resins such as polythiophene and polypyrrole.

The electrically conductive material used for the cathode is suitably selected from those having a work function of smaller than 4 eV. This electrically conductive material includes magnesium, calcium, tin, lead, titanium, yttrium, lithium, ruthenium, manganese, and alloys of these. Typical examples of the alloys include magnesium/silver, magnesium/indium and lithium/aluminum, while the alloys shall not be limited to these. Each of the anode and the cathode may be formed of two layers or more as required.

For the effective light emission of the organic EL device, at least one of the electrodes is desirably transparent in the light emission wavelength region of the device. Further, the substrate is desirably transparent. The transparent electrode is produced from the above electrically conductive material by a deposition method or a sputtering method such that a predetermined transparency is secured. The electrode which forms a light emission surface preferably has a light transmittance of at least 10%.

The substrate is not specially limited so long as it has adequate mechanical and thermal strength and is transparent. For example, it is selected from glass substrates and substrates of transparent resins such as a polyethylene substrate, a polyethylene substrate, a polyether sulfone substrate and a polypropylene substrate. The substrate may have the form of a plate or a film.

Each of the layers forming the organic EL device of the present invention can be formed by any one of dry film forming methods such as a vacuum deposition method and a sputtering method and wet film forming methods such as a spin coating method and a dipping method. The thickness of each layer is not specially limited, while each layer is required to have a proper thickness. When the layer thickness is too large, inefficiently, a high voltage is required to achieve predetermined emission of light. When the layer thickness is too small, the layer is liable to have a pinhole, etc., so that sufficient light emission brightness is hard to obtain when an electric field is applied. Generally, the thickness of each layer is preferably in the range of from 5 nm to 10 µm, more preferably 10 nm to 0.2 µm.

In the wet film forming method, a material for forming an intended layer is dissolved or dispersed in a proper solvent, and a thin film is formed from the solution or dispersion. The solvent is selected from chloroform, tetrahydrofuran or dioxane, while the solvent shall not be limited to these. For improving the film formability and preventing the occurrence of pinholes, the above solution or dispersion for forming the layer may contain a proper resin and a proper additive.

The resin suitable for use in the present invention includes insulating resins such as polystyrene, polycarbonate, polyarylate, polyester, polyamide, polyurethane, polysulfone, polymethyl methacrylate, polymethyl acrylate and cellulose, photoconductive resins such as poly-N-vinylcarbozole and polysilane, and electrically conductive resins such as polythiophene and polypyrrole. The above additive includes an antioxidant, an ultraviolet absorbent and a plasticizer.

The light-emitting material or doping material used in the organic EL device of the present invention includes anthracene, naphthalene, phenanthrene, pyrene, tetracene, coronene, chrysene, fluorescein, perylene, phthaloperylene, naphthaloperylene, perinone, naphthaloperinone, diphenylbutadiene, tetraphenylbutadiene, coumarine, oxadiazole, aldazine, bisbenzoxazoline, bisstyryl, pyrazine, cyclopentadiene, quinoline metal complex, aminoquinoline metal complex, benzoquinoline metal complex, imine, diphenylethylene, vinyl anthracene, diaminocarbazole, triphenylamine, benzidine type triphenylamine, styrylamine type triphenylamine, diamine type triphenylamine pyrane, thiopyrane, polymethine, merocyanine, an imidazole-chelated oxynoid compound, quinacridone, rubrene and derivatives of these, although the above material shall not be limited to these.

The hole-transporting material which can be used in combination with the hole-transporting material of the general formula [1] is selected from compounds which are capable of transporting holes, have an excellent effect of injecting holes to the light-emitting layer or the light-emitting material, prevent the movement of excitons generated in the light-emitting to the electron-injecting layer or the electron-transporting material and have the excellent capability of forming a thin film. Specific examples of the above hole-transporting material include a phthalocyanine compound, a naphthalocyanine compound, a porphyrin compound, oxadiazole, triazole, imidazole, imidazolone, imidazolthione, pyrazoline, pyrazolone, tetrahydroimidazole, oxazole, oxadiazole, hydrazone, acylhydrazone, polyarylalkane, stilbene, butadiene, benzidine type triphenylamine, styrylamine type triphenylamine, diamine type triphenylamine, derivatives of these, and polymer materials such as polyvinylcarbazole, polysilane and an electrically conductive polymer. However, the hole-transporting material shall not be limited to the above materials.

The electron-transporting material can be selected from compounds which are capable of transporting electrons, have an excellent effect of injecting electron to the light-emitting layer or the light-emitting material, prevent the movement of excitons generated in the light-emitting layer into the hole-injecting layer or the hole-injecting material and have the excellent capability of forming a thin film. Although not specially limited, examples of the electron-transporting material include fluorenone, anthraquinodimethane, diphenoquinone, thiopyran dioxide, oxadiazole, perylenetetracarboxylic acid, fluorenylidenemethane, anthraquinodimethane, anthrone, and derivatives of these. Further, the hole-transporting material may be sensitivity-increased by incorporating an electron-accepting material, and the electron-transporting material may be sensitivity-increased by incorporating an electron-donating material.

The compound of the general formula [1] provided by the present invention can be used in any layer of the organic EL device, and in addition to the compound of the general formula [1], the layer may contain at least one of the light-emitting material, the doping material, the hole-transporting material and the electron-transporting material. For improving the organic EL device of the present invention in the stability against temperature, humidity and ambient atmosphere, a protective layer may be formed on the surface of the device, or the device as a whole may be sealed with a silicone oil, or the like.

As explained above, the present invention can increase the light emission efficiency and the light emission brightness owing to the use of the compound of the general formula [1] in the organic EL device. Further, the organic EL device of the present invention is stable against heat and electric current and can provide a practically acceptable light emission brightness at a low drive voltage, and the device can be greatly improved with regard to the deterioration of the brightness, a large problem of a conventional device.

The organic EL device of the present invention has high industrial values since it can be adapted for a flat panel display of an on-wall television set, a flat light-emitting device, a light source for a copying machine or a printer, a light source for a liquid crystal display or counter, a display signboard and a signal light.

The use of the compound of the general formula [1], provided by the present invention, for an electrophotographic photoreceptor will be explained hereinafter. The compound of the general formula [1] can be used in any layer of the electrophotographic photoreceptor, while it is preferably used as a hole-transporting material since it has high hole-transporting capability. The compound of the general formula [1] works as a hole-transporting material, can very effectively transport charges generated by optical absorption and gives a photoreceptor excellent in fast response. Further, the compound of the general formula [1] is excellent in ozone resistance and optical stability and therefore can give a photoreceptor having excellent durability.

The electrophotographic photoreceptor is largely classified into a mono-layered photoreceptor produced by forming a photosensitive layer of a dispersion of a charge-generating material and an optional charge-transporting material in a binder resin on an electrically conductive substrate, and a laminated photoreceptor produced by laminating an undercoat layer, a charge-generating layer and a hole-transporting layer on an electrically conductive substrate in the order of the undercoat layer, the charge-generating layer and the hole-transporting layer or by laminating a hole-transporting layer and a charge-generating layer on an electrically conductive substrate or an undercoat layer in the order of the hole-transporting layer and the charge-generating layer. The above undercoat layer may be omitted. Further, the photoreceptor may be provided with an overcoat layer for the protection of its surface from activated gas and for the prevention of filming of a toner.

The material for the charge-generating layer is selected from organic compounds such as bisazo, quinacridone, diketopyrrolopyrrole, indigo, perylene, perinone, polycyclic quinone, squarylium salt, azulenium salt, phthalocyanine and naphthalocyanine, or inorganic materials such as selenium, a selenium-tellurium alloy, cadmium sulfide, zinc oxide and amorphous silicon.

Each layer of the photoreceptor can be formed by a deposition method or a dispersion application method. The dispersion application may be carried out with a spin coater, an applicator, a spray coater, a dipping coater, a roll coater, a curtain coater or a bead coater. The coating formed by the dispersion application may be dried at a temperature between room temperature and 200° C. for 10 minutes to 6 hours while the coated substrate is allowed to stand or under the condition of air blowing. When the photoreceptor is a mono-layered one, the thickness of the dry photosensitive layer is 5 to 50 $\mu$m. When the photoreceptor is a laminated one, the thickness of the charge-generating layer is 0.01 to 5 $\mu$m, preferably 0.1 to 1 $\mu$m, and the thickness of the hole-transporting layer is 5 to 50 $\mu$m, preferably 10 to 20 $\mu$m.

The resin used for forming the photosensitive layer of the mono-layered photoreceptor or for forming the charge-generating layer or the hole-transporting layer of the laminated photoreceptor can be selected from a broad range of insulating resins. Further, the above resin can be also selected from organic photoconductive polymers such as poly-N-vinylcarbazole, polyvinylanthracene and polysilanes. The above resin is preferably selected from insulating resins such as polyvinyl butyral, polyarylate, polycarbonate, polyester, phenoxy, acryl, polyamide, urethane, epoxy, silicone, polystyrene, polyvinyl chloride, vinyl chloride-vinyl acetate copolymer, phenol and melamine resins. Although not specially limited, the amount of the resin used for forming the charge-generating layer or the hole-transporting layer is preferably 100% by weight or less based on the weight of the charge-generating material or the hole-transporting material. The above resins may be used alone or in combination. Further, if necessary, no resin may be used. Further, the charge-generating layer may be formed by a physical film-forming method such as a deposition or sputtering method. In the deposition or sputtering method, the charge-generating layer is preferably formed in an atmosphere under a vacuum of $10^{-5}$ Torr or less. Further, the charge-generating layer may be formed in an inert gas such as nitrogen, argon or helium.

The solvent used for forming each layer of the electrophotographic photoreceptor is preferably selected from those solvents which have no influence on the undercoat layer and other photosensitive layer. Specifically, the above solvent is selected from aromatic hydrocarbons such as benzene and xylene, ketones such as acetone, methyl ethyl ketone and cyclohexanone, alcohols such as methanol and ethanol, esters such as ethyl acetate and methyl cellosolve, halogenated aliphatic hydrocarbons such as carbon tetrachloride, chloroform, dichloromethane, dichloroethane and trichloroethylene, halogenated aromatic hydrocarbons such as chlorobenzene and dichlorobenzene, and ethers such as tetrahydrofuran and dioxane.

The hole-transporting layer is formed by a method in which the hole-transporting material alone or a solution of the hole-transporting material in the insulating resin is applied, or by a dry film-forming method such as a deposition method. The hole-transporting material for forming the photoreceptor in the present invention may be a combination of the compound of the general formula [1] with other hole-transporting material. Further, when the compound of the general formula [1] is used in combination with the insulating resin for improving the photoreceptor in heat resistance and abrasion resistance, the compound of the general formula [1] is excellent in compatibility with the resin and gives almost no precipitate, so that it is advantageous for improving the photoreceptor in the sensitivity and durability.

For improving the electrophotographic characteristics and image characteristics, an undercoat layer may be provided between the substrate and the organic layer. The undercoat layer is formed of a resin selected from polyamides, casein, polyvinyl alcohol, gelatin and polyvinyl butyral or a metal oxide such as aluminum oxide.

Not only the compound of the general formula [1] is suitable as a hole-transporting material for an electrophotographic photoreceptor of a copying machine or a printer, but also it can be used in the fields of organic photoconductive materials for a photoelectric converting device, a solar cell and an image senser.

EXAMPLES

The present invention will be explained more in detail with reference to Examples hereinafter. In Examples, "part" stands for "part by weight".

The DSC analysis shows the following. The compound of the general formula [1] has a glass transition temperature of 100° C. or higher, a melting point of 250° C. or higher and a decomposition point of 300° C. or higher, i.e., a higher glass transition temperature, a higher melting point and a higher decomposition point than 4,4',4"-tris[N-(3- methylphenyl)-N-phenylamino]triphenylamine which has been conventionally used as a non-crystalline hole-transporting material, and the compound of the general formula [1] has high heat resistance as a hole-transporting material for an organic EL device. Further, the compound of the general formula [1] is a non-crystalline compound having low crystallizability so that it has excellent adhesion to an anode substrate and an organic thin film, and it is advantageous in durability in environments as a thin film and the device life and light emission life in the continuous operation.

Synthesis of Compound (2) in Table 1

25 Parts of 9-bromophenanthrene, 9.8 parts of anylene, 22 parts of anhydrous calcium carbonate and 0.5 part of a copper powder were added to 100 parts of 1,3-dimethyl-2-imidazolidinone, and the mixture was stirred at 200° C. for 25 hours. Then, the mixture was diluted with 500 parts of water and extracted with ethyl acetate, and the extract was concentrated and purified by silica gel column chromatography to give 18 parts of a solid having slight brown. The solid was analyzed by FD-MS to show that the compound was phenyl-9-phenanthrenylamine.

4.32 Parts of tris(p-bromophenyl)amine, 12.28 parts of phenyl-9-phenanthrenylamine, 8 parts of anhydrous calcium carbonate and 0.5 part of a copper powder were added to 15 parts of nitrobenzene, and the mixture was stirred at 200° C. for 50 hours. Then, the mixture was diluted with 500 parts of water and extracted with ethyl acetate, and the extract was concentrated and purified by silica gel column chromatography to give 8 parts of a white powder. The powder was analyzed by FD-MS for a molecular weight to show that the powder was Compound (2).

Synthesis of Compound (6) in Table 1

25 Parts of 5,6,7,8-tetrahydro-1-naphthylamine, 26.7 parts of bromobenzene, 20 parts of anhydrous calcium carbonate and 0.5 part of a copper powder were added to 100 parts of 1,3-dimethyl-2-imidazolidinone, and the mixture was stirred at 200° C. for 25 hours. Then, the mixture was diluted with 500 parts of water and extracted with ethyl acetate, and the extract was concentrated and purified by silica gel column chromatography to give 24 parts of a liquid having slight reddish brown. The liquid was analyzed by FD-MS to show that the compound was phenyl-1-(5,6,7,8-tetrahydro)naphthylamine.

9.64 Parts of tris(p-bromophenyl)amine, 17.84 parts of phenyl-1-(5,6,7,8-tetrahydro)naphthylamine, 12 parts of anhydrous calcium carbonate and 0.5 part of a copper powder were added to 20 parts of nitrobenzene, and the mixture was stirred at 200° C. for 50 hours. Then, the mixture was diluted with 500 parts of water and extracted with ethyl acetate, and the extract was concentrated and purified by silica gel column chromatography to give 15 parts of a white powder. The powder was analyzed by FD-MS for a molecular weight to show that the powder was Compound (6). FIG. 1 shows the infrared absorption spectrum (KBr tablet method) of Compound (6).

Example 1

Compound (2) shown in Table 1 was vacuum-deposited on a cleaned glass plate with an ITO electrode to form a hole-injecting layer having a thickness of 30 nm. Then, 4,4'-bis[N-(1-naphthyl)-N-phenylamino]biphenyl(α-NPD) was vacuum-deposited thereon to form a hole-transporting layer having a thickness of 10 nm. Further, Compound (22) having the following structure was vacuum-deposited to form an electron-injection type light-emitting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of about 550 (cd/m$^2$) at a direct current voltage of 5 V and a light emission efficiency of 3.6 (lm/W).

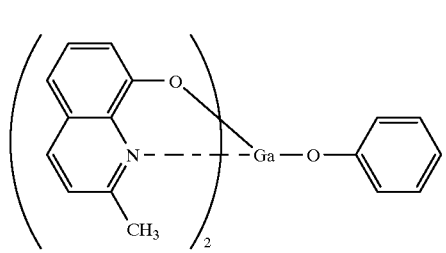

(22)

Examples 2–4

Compound shown in Table 1 (indicated in Table 2) was dissolved in chloroform, and the resultant solution was applied to a cleaned glass substrate with an ITO electrode by a spin coating method, to form a hole-injecting layer having a thickness of 50 nm. Then, Compound (22) was vacuum-deposited to form a light-emitting layer having a thickness of 50 nm. An electrode having a thickness of 100 nm was formed thereon from a magnesium/silver alloy having a magnesium/silver mixing ratio of 10/1, to obtain an organic EL device. The light-emitting layer was formed under a vacuum of $10^{-6}$ Torr at a substrate temperature of room temperature. The organic EL device showed light emission characteristics at a direct current of 5 V as shown in Table 2.

TABLE 2

| Example | Compound | Light emission brightness (cd/m$^2$) | Light emission efficiency (lm/W) |
|---|---|---|---|
| 2 | (1) | 380 | 2.0 |
| 3 | (2) | 420 | 2.5 |
| 4 | (3) | 440 | 2.4 |

Example 5

Compound (2) shown in Table 1 was vacuum-deposited on a cleaned glass plate with an ITO electrode to form a hole-injecting layer having a thickness of 40 nm. Then, 4,4'-bis[N-(1-naphthyl)-N-phenylamino]biphenyl(α-NPD) was vacuum-deposited thereon to form a hole-transporting layer having a thickness of 10 nm. Further, a tris(8-hydroxyquinoline)aluminum complex was vacuum-deposited to form a light-emitting layer having a thickness of 50 nm. Further, Compound (22) was vacuum-deposited to form an electron-injecting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of about 600 (cd/m$^2$) at a direct current voltage of 5 V and a light emission efficiency of 4.2 (lm/W).

Example 6

Compound (2) shown in Table 1 was vacuum-deposited on a cleaned glass plate with an ITO electrode to form a hole-injecting layer having a thickness of 30 nm. Then, Compound (23) was vacuum-deposited thereon to form a light-emitting layer having a thickness of 40 nm. Further, a tris(8-hydroxyquinoline)aluminum complex was vacuum-deposited to form an electron-injecting layer having a thickness of 30 nm. An electrode having a thickness of 100 nm was formed thereon from a magnesium/silver alloy having a magnesium/silver mixing ratio of 10/1, to obtain an organic EL device. Each layer was formed under a vacuum of $10^{-5}$ Torr at a substrate temperature of room temperature. The organic EL device showed a light emission brightness of 470 (cd/m$^2$) at a direct current voltage of 5 V and a light emission efficiency of 3.7 (lm/W).

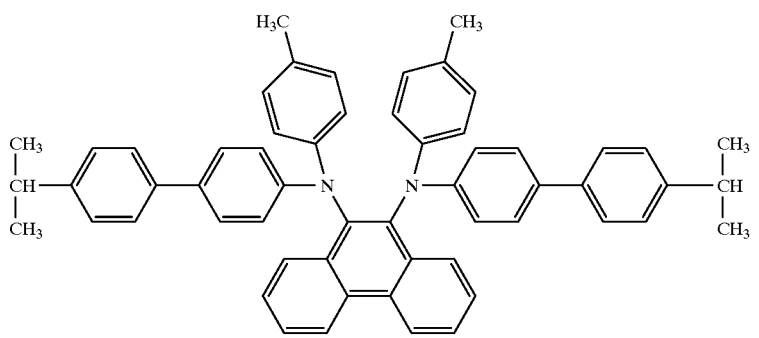

(23)

Comparative Example 1

An organic EL device was prepared in the same manner as in Example 6 except that 4,4',4"-tris[N-(3-methylphenyl)-N-phenylamino]triphenylamine was used for forming a hole-injecting layer. The organic EL device showed a light emission brightness of about 220 (cd/m$^2$) at a direct current voltage of 5 V and a light emission efficiency of 1.5 (lm/W).

Comparative Example 2

An organic EL device was prepared in the same manner as in Example 1 except that Compound (2) used for forming a hole-injecting layer was replaced with 4,4',4"-tris[N-(1-naphthyl)-N-phenylamino]triphenylamine. The organic EL device showed a light emission brightness of 310 (cd/m$^2$) at a direct current voltage of 5 V and a light emission efficiency of 2.5 (lm/W).

Comparative Example 3

An organic EL device was prepared in the same manner as in Example 5 except that Compound (2) used for forming a hole-injecting layer was replaced with 4,4',4"-tris[N-(2-naphthyl)-N-phenylamino]triphenylamine. The organic EL device showed a light emission brightness of 380 (cd/m$^2$) at a direct current voltage of 5 V and a light emission efficiency of 2.4 (lm/W).

Comparative Example 4

An organic EL device was prepared in the same manner as in Example 6 except that Compound (2) used for forming a hole-injecting layer was replaced with 4,4',4"-tris[N-(1-naphthyl)-N-phenylamino]triphenylamine. The organic EL device showed a light emission brightness of 200 (cd/m$^2$) at a direct current voltage of 5 V and a light emission efficiency of 1.8 (lm/W).

When the organic EL devices obtained in the above Examples were allowed to continuously emit light at 3 mA/cm$^2$, all the organic EL devices emitted light having a brightness of more than 50% of the initial brightness for more than 1,000 hours. When the organic EL devices obtained in Comparative Examples 1 and 2 were allowed to continuously emit light under the same conditions, the light emission brightness decreased to less than 50% of the initial brightness in 200 hours, and the number of dark spots increased. The reason therefor is assumed to be as follows. The compounds of the present invention are non-planar so that they can form non-crystalline thin films when used for producing thin films. Further, since the compounds contain many fused aromatic rings, they are improved in the capability of transporting holes, and the organic EL devices are improved in the capability of being implanted with holes and the capability of transporting holes. Moreover, since the compounds of the present invention as hole-transporting materials are improved in heat resistance, the organic EL devices for which the hole-transporting materials of the present invention are adapted are improved in durability against heat generation caused by continuous light emission.

The organic EL device of the present invention achieves improvements in the light emission efficiency and brightness and a longer device life, and shall not impose any limitation on light-emitting materials, dopants, hole-transporting materials, electron-transporting materials, sensitizers, resins and electrode materials used in combination with it, nor shall it impose any limitation on the method of producing the device.

Examples of the hole-transporting material of the present invention for use in an electrophotographic photoreceptor will be explained hereinafter.

Examples 7–9

2 Grams of τ-form metal-free phthalocyanine and 2 g of a polyvinyl butyral resin (BH-3, supplied by Sekisui Chemical Co., Ltd.) were dispersed together with 96 g of tetrahydrofuran with a ball mill for 2 hours. The resultant dispersion was applied to an aluminum substrate and dried to form a charge-generating layer having a thickness of 0.3 μm. Then, 10 g of Compound shown in Table 3 and 10 g of a polycarbonate resin (L-1250, supplied by Teijin Chemical Ltd.) were dissolved in 80 g of dichloromethane. The resultant solution was applied onto the charge-generating layer and dried to form a hole-transporting layer having a thickness of 20 μm, whereby a laminated electrophotographic photoreceptor was obtained.

The above-obtained electrophotographic photoreceptors were measured for electrophotographic characteristics as follows. Each photoreceptor was exposed to white light of 5 (lux) with an electrostatic copying paper testing machine (EPA-8100, supplied by Kawaguchi Electric Works) at a static mode 2 at a corona charge of −5.2 (kv) to measure or calculate an initial surface potential ($V_0$), a ratio of a surface potential ($V_2$) after 2 seconds' standing in a dark place to $V_0$ (dark attenuation ratio: $DDR_2=V_2/V_0$), a half exposure dose sensitivity ($E_{1/2}$) based on a time required for a charge amount being decreased to ½ of an initial value after the exposure and a surface potential after 3 seconds from the exposure ($VR_3$). Table 3 shows the results.

TABLE 3

| Example | Compound | $V_0$ (−V) | $DDR_2$ (%) | $E_{½}$ (lux · s) | $VR_3$ (−V) |
|---------|----------|------------|-------------|-------------------|-------------|
| 7 | (1) | 770 | 98 | 0.7 | 10 |
| 8 | (2) | 770 | 96 | 0.6 | 2 |
| 9 | (3) | 810 | 95 | 0.8 | 10 |

When the electrophotographic photoreceptors obtained in the above Examples were used for making at least 10,000 copies each, there were only differences by less than 2% between the electrophotographic characteristics such as surface potential and sensitivity and the image density found before making the 10,000 copies and those found after making the 10,000 copies. It is therefore seen that the electrophotographic photoreceptor of the present invention has stable electrophotographic characteristics and continues to give high quality images.

Comparative Example 5

An electrophotographic photoreceptor was prepared in the same manner as in Example 7 except that the compound (1) used for forming a hole-transporting layer was replaced with 4,4',4"-tris[N-(3-methylphenyl)-N-phenylamino]triphenylamine. The electrophotographic photoreceptor showed the following electrophotographic characteristics; initial surface potential ($V_0$)=−75 (V), ratio of a surface potential ($V_2$) after 2 seconds' standing in a dark place to $V_0$ (dark attenuation ratio: $DDR_2$)=90%, a half exposure dose sensitivity ($E_{1/2}$)=1.0 (lux·s), and surface potential after 3 seconds from the exposure ($VR_3$)=−25 (V). Therefore, the above material is inferior to the hole-transporting material of the present invention. Further, when the above electrophotographic photoreceptor was used for making at least 10,000 copies, there were only differences by more than 10% between the electrophotographic characteristics found before making the 10,000 copies and those found after making the 10,000 copies. Thus, no high quality images can be obtained.

Example 10

Compound (4) shown in Table 1 was vacuum-deposited on a cleaned glass plate with an ITO electrode to form a hole-injecting layer having a thickness of 30 nm. Then, a tris(8-hydroxyquinoline)aluminum complex was vacuum-deposited thereon to form a light-emitting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of 120 ($cd/m^2$) at a direct current voltage of 5 V and a light emission efficiency of 1.2 (lm/W).

Example 11

An organic EL device was prepared in the same manner as in Example 10 except that the hole-injecting layer was replaced with a hole-injecting layer formed by a spin coating method using a solution of Compound (5) shown in Table 1 in chloroform. The organic EL device showed a light emission brightness of 130 ($cd/m^2$) at a direct current voltage of 5 v and a light emission efficiency of 1.9 (lm/W).

Example 12

Compound (6) shown in Table 1 was vacuum-deposited on a cleaned glass plate with an ITO electrode to form a hole-injecting layer having a thickness of 30 nm. Then, 4,4'-bis[N-(1-naphthyl)-N-phenylamino]biphenyl(α-NPD) was vacuum-deposited thereon to form a hole-transporting layer having a thickness of 10 nm. Further, the same Compound (22) as that used in Example 3 was vacuum-deposited to form an electron-injection type light-emitting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of 270 ($cd/m^2$) at a direct current voltage of 5 V and a light emission efficiency of 2.1 (lm/W).

Examples 13–30

Compound shown in Table 1 (indicated in Table 4) was dissolved in chloroform, and the resultant solution was applied to a cleaned glass substrate with an ITO electrode by a spin coating method, to form a hole-injecting layer having a thickness of 50 nm. Then, Compound (22) was vacuum-deposited to form a light-emitting layer having a thickness of 50 nm. An electrode having a thickness of 100 nm was formed thereon from a magnesium/silver alloy having a magnesium/silver mixing ratio of 10/1, to obtain an organic EL device. The light-emitting layer was formed under a vacuum of $10^{-6}$ Torr at a substrate temperature of room temperature. The organic EL device showed light emission characteristics at a direct current of 5 V as shown in Table 4.

TABLE 4

| Example | Compound | Light emission brightness ($cd/m^2$) | Light emission efficiency (lm/W) |
|---------|----------|--------------------------------------|----------------------------------|
| 13 | (4) | 410 | 2.3 |
| 14 | (5) | 440 | 2.4 |
| 15 | (6) | 510 | 3.2 |
| 16 | (7) | 500 | 3.1 |
| 17 | (8) | 520 | 2.8 |
| 18 | (9) | 440 | 2.7 |
| 19 | (10) | 450 | 2.8 |
| 20 | (11) | 460 | 2.5 |
| 21 | (12) | 430 | 2.5 |
| 22 | (13) | 430 | 2.4 |
| 23 | (14) | 500 | 2.2 |
| 24 | (15) | 510 | 2.7 |
| 25 | (16) | 500 | 2.7 |
| 26 | (17) | 480 | 2.7 |
| 27 | (18) | 450 | 2.5 |
| 28 | (19) | 450 | 2.8 |
| 29 | (20) | 490 | 2.3 |
| 30 | (21) | 420 | 2.4 |

Example 31

Compound (6) shown in Table 1 was vacuum-deposited on a cleaned glass plate with an ITO electrode to form a hole-injecting layer having a thickness of 40 nm. Then, 4,4'-bis[N-(1-naphthyl)-N-phenylamino]biphenyl(α-NPD) was vacuum-deposited thereon to form a hole-transporting layer having a thickness of 10 nm. Further, a tris(8-hydroxyquinoline)aluminum complex was vacuum-deposited to form a light-emitting layer having a thickness of 50 nm. Further, Compound (22) was vacuum-deposited to form an electron-injecting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of 500 (cd/m$^2$) at a direct current voltage of 5 V and a light emission efficiency of 2.7 (lm/W).

Example 32

Compound (9) shown in Table 1 was vacuum-deposited on a cleaned glass plate with an ITO electrode to form a hole-injecting layer having a thickness of 40 nm. Then, 4,4'-bis[N-(1-naphthyl)-N-phenylamino]biphenyl(α-NPD) was vacuum-deposited thereon to form a hole-transporting layer having a thickness of 10 nm. Further, Compound (23) having the following structure was vacuum-deposited to form a light-emitting layer having a thickness of 50 nm. Further, a tris(8-hydroxyquinoline)aluminum complex was vacuum-deposited to form an electron-injecting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of 400 (cd/m$^2$) at a direct current voltage of 5 V and a light emission efficiency of 2.4 (lm/W).

Example 33

Compound (6) shown in Table 1 and rubrene in a Compound (6)/rubrene weight ratio of 20/1 were vacuum-deposited on a cleaned glass plate with an ITO electrode to form a hole-injection type light-emitting layer having a thickness of 60 nm. Further, a tris(8-hydroxyquinoline)-aluminum complex was vacuum-deposited to form an electron-injecting layer having a thickness of 20 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of 660 (cd/m$^2$) at a direct current voltage of 5 V and a light emission efficiency of 3.4 (lm/W).

Example 34

Compound (6) shown in Table 1 was vacuum-deposited on a cleaned glass plate with an ITO electrode to form a hole-injecting layer having a thickness of 40 nm. Then, 4,4'-bis[N-(1-naphthyl)-N-phenylamino]biphenyl(α-NPD) was vacuum-deposited thereon to form a hole-transporting layer having a thickness of 10 nm. Further, a tris(8-hydroxyquinoline)aluminum complex was vacuum-deposited to form a light-emitting layer having a thickness of 50 nm. Further, Compound (22) was vacuum-deposited to form an electron-injecting layer having a thickness of 50 nm. An electrode having a thickness of 150 nm was formed thereon from a magnesium/silver alloy having a magnesium/silver mixing ratio of 10/1, to obtain an organic EL device. The hole-injecting layer and the light-emitting layer were formed under a vacuum of $10^{-6}$ Torr at a substrate temperature of room temperature. The organic EL device showed a light emission brightness of about 570 (cd/m$^2$) at a direct current voltage of 5 V and a light emission efficiency of 3.8 (lm/W).

Example 35

Compound (6) shown in Table 1 was dissolved in chloroform, and the resultant solution was applied to a cleaned glass substrate with an ITO electrode by a spin coating method, to form a hole-injecting layer having a thickness of 30 nm. Then, 4,4'-bis[N-(1-naphthyl)-N-phenylamino]biphenyl(α-NPD) was vacuum-deposited to form a hole-transporting layer having a thickness of 10 nm. Further, Compound (22) was vacuum-deposited to form a light-emitting layer having a thickness of 50 nm. An electrode having a thickness of 100 nm was formed thereon from a magnesium/silver alloy having a magnesium/silver mixing ratio of 10/1, to obtain an organic EL device. The hole-transporting layer and the light-emitting layer were formed under a vacuum of $10^{-5}$ Torr at a substrate temperature of room temperature. The organic EL device showed a light emission brightness of 540 (cd/m$^2$) at a direct current voltage of 5 V and a light emission efficiency of 4.5 (lm/W).

Example 36

Compound (6) shown in Table 1 was vacuum-deposited on a cleaned glass plate with an ITO electrode to form a hole-injecting layer having a thickness of 30 nm. Then, Compound (23) was vacuum-deposited to form a light-emitting layer having a thickness of 40 nm. Further, a tris(8-hydroxyquinoline)aluminum complex was vacuum-deposited to form an electron-injecting layer having a thickness of 30 nm. An electrode having a thickness of 100 nm was formed thereon from a magnesium/silver alloy having a magnesium/silver mixing ratio of 10/1, to obtain an organic

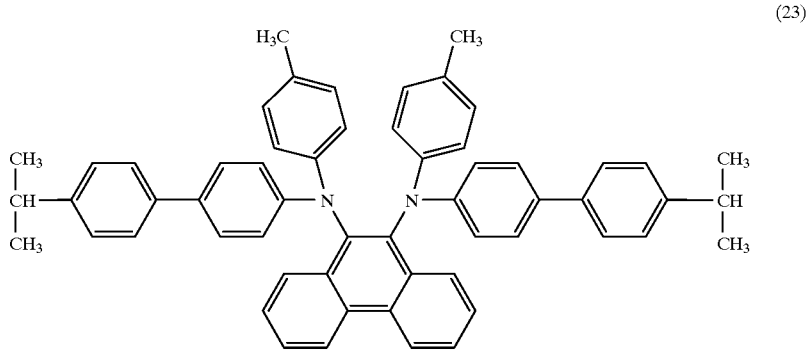

(23)

EL device. Each layer was formed under a vacuum of $10^{-5}$ Torr at a substrate temperature of room temperature. The organic EL device showed a light emission brightness of 520 ($cd/m^2$) at a direct current voltage of 5 V and a light emission efficiency of 4.1 (lm/W).

Comparative Example 6

An organic EL device was prepared in the same manner as in Example 31 except that Compound (6) was replaced with 4,4',4"-tris[N-(3-methylphenyl)-N-phenylamino] triphenylamine for forming a hole-injecting layer. The organic EL device showed a light emission brightness of about 220 ($cd/m^2$) at a direct current voltage of 5 V and a light emission efficiency of 1.5 (lm/W).

Comparative Example 7

An organic EL device was prepared in the same manner as in Example 15 except that Compound (6) used for forming a hole-injecting layer was replaced with 4,4',4"-tris[N-(1-naphthyl)-N-phenylamino]triphenylamine. The organic EL device showed a light emission brightness of 450 ($cd/m^2$) at a direct current voltage of 5 V and a light emission efficiency of 2.8 (lm/W).

Comparative Example 8

An organic EL device was prepared in the same manner as in Example 15 except that Compound (6) used for forming a hole-injecting layer was replaced with 4,4',4"-tris[N-(2-naphthyl)-N-phenylamino]triphenylamine. The organic EL device showed a light emission brightness of 380 ($cd/m^2$) at a direct current voltage of 5 V and a light emission efficiency of 2.1 (lm/W).

Comparative Example 9

An organic EL device was prepared in the same manner as in Example 34 except that Compound (6) used for forming a hole-injecting layer was replaced with 4,4',4"-tris[N-(1-naphthyl)-N-phenylamino]triphenylamine. The organic EL device showed a light emission brightness of 440 ($cd/m^2$) at a direct current voltage of 5 V and a light emission efficiency of 2.8 (lm/W).

Comparative Example 10

An organic EL device was prepared in the same manner as in Example 35 except that Compound (6) used for forming a hole-injecting layer was replaced with 4,4',4"-tris[N-(1-naphthyl)-N-phenylamino]triphenylamine. The organic EL device showed a light emission brightness of 410 ($cd/m^2$) at a direct current voltage of 5 V and a light emission efficiency of 2.3 (lm/W).

When the organic EL devices obtained in the above Examples 39 to 62 were allowed to continuously emit light at 3 $mA/cm^2$, all the organic EL devices emitted light having a brightness of more than 50% of the initial brightness for more than 1,000 hours. When the organic EL devices obtained in Comparative Examples 1 and 5 were allowed to continuously emit light under the same conditions, the light emission brightness decreased to less than 50% of the initial brightness in 200 hours, and the number of dark spots increased. The compounds of the present invention are non-planar so that they can form non-crystalline thin films when used for producing thin films. Further, since the compounds contain many fused aromatic rings, they are improved in the capability of transporting holes, and the organic EL devices are improved in the capability of being implanted with holes and the capability of transporting holes. Moreover, since the compounds of the present invention as hole-transporting materials are improved in heat resistance, the organic EL devices for which the hole-transporting materials of the present invention are adapted are improved in durability against heat generation caused by continuous light emission. In the compound of the general formula [1], adjacent substituents on an aryl group form a cycloalkyl group so that the non-crystallizability increases, and the compound of the general formula [1] is improved in the capability of being implanted with holes from a substrate and the adhesion to the substrate.

The organic EL device of the present invention achieves improvements in the light emission efficiency and brightness and a longer device life, and shall not impose any limitation on light-emitting materials, dopants, hole-transporting materials, electron-transporting materials, sensitizers, resins and electrode materials used in combination with it, nor shall it impose any limitation on the method of producing the device.

Examples of the hole-transporting material of the present invention for use in an electrophotographic photoreceptor will be explained hereinafter.

Example 37

4 Grams of ϵ-form copper phthalocyanine, 2 g of Compound (6) shown in Table 1 and 14 g of a polyester resin (Vylon 200, supplied by Toyobo Co., Ltd.) were dispersed together with 80 g of tetrahydrofuran with a ball mill for 5 hours. The resultant dispersion was applied to an aluminum substrate and dried to give a mono-layered electrophotographic photoreceptor having a thickness of 20 μm.

Example 38

6 Grams of dibromoanthanthrone, 2 g of Compound (9) shown in Table 1 and 12 g of a polyester resin (Vylon 200, supplied by Toyobo Co., Ltd.) were dispersed together with 80 g of tetrahydrofuran with a ball mill for 5 hours. The resultant dispersion was applied to an aluminum substrate and dried to give a mono-layered electrophotographic photoreceptor having a thickness of 20 μm.

Example 39

2 Grams of N,N'-bis(2,6-dichlorophenyl)-3,4,9,10-perylenedicarboxyimide and 2 g of a polyvinyl butyral resin (BH-3, supplied by Sekisui Chemical Co., Ltd.) were dispersed together with 96 g of tetrahydrofuran with a ball mill for 2 hours. The resultant dispersion was applied to an aluminum substrate and dried to form a charge-generating layer having a thickness of 0.3 μm. Then, 10 g of Compound (13) shown in Table 1 and 10 g of a polycarbonate resin (Panlite L-1250, supplied by Teijin Chemical Ltd.) were dissolved in 80 g of dichloromethane. The resultant solution was applied onto the charge-generating layer and dried to form a hole-transporting layer having a thickness of 20 μm, whereby a laminated electrophotographic photoreceptor was obtained.

Examples 40–57

2 Grams of T-form metal-free phthalocyanine and 2 g of a polyvinyl butyral resin (BH-3, supplied by Sekisui Chemical Co., Ltd.) were dispersed together with 96 g of tetrahydrofuran with a ball mill for 2 hours. The resultant dispersion was applied to an aluminum substrate and dried to form a charge-generating layer having a thickness of 0.3 μm. Then, 10 g of Compound shown in Table 5 and 10 g of a polycarbonate resin (Panlite L-1250, supplied by Teijin Chemical Ltd.) were dissolved in 80 g of dichloromethane. The resultant solution was applied onto the charge-generating layer and dried to form a hole-transporting layer having a thickness of 20 μm, whereby a laminated electrophotographic photoreceptor was obtained.

The above-obtained electrophotographic photoreceptors were measured for electrophotographic characteristics in the same manner as in Example 1. Table 5 shows the results.

TABLE 5

| Example | Compound | $V_0$ (−V) | $DDR_2$ (%) | $E_{1/2}$ (lux · s) | $VR_3$ (−V) |
|---|---|---|---|---|---|
| 37 | (6) | 580 | 93 | 2.1 | 15 |
| 38 | (9) | 610 | 93 | 2.7 | 20 |
| 39 | (13) | 600 | 92 | 1.7 | 10 |
| 40 | (4) | 800 | 96 | 0.7 | 5 |
| 41 | (5) | 810 | 96 | 0.6 | 3 |
| 42 | (6) | 810 | 97 | 0.5 | 1 |
| 43 | (7) | 800 | 97 | 0.7 | 5 |
| 44 | (8) | 820 | 97 | 0.7 | 4 |
| 45 | (9) | 810 | 97 | 0.5 | 5 |
| 46 | (10) | 800 | 97 | 0.6 | 6 |
| 47 | (11) | 810 | 98 | 0.6 | 6 |
| 48 | (12) | 820 | 97 | 0.6 | 5 |
| 49 | (13) | 800 | 97 | 0.5 | 2 |
| 50 | (14) | 820 | 96 | 0.6 | 4 |
| 51 | (15) | 800 | 98 | 0.6 | 4 |
| 52 | (16) | 820 | 98 | 0.6 | 5 |
| 53 | (17) | 790 | 98 | 0.5 | 5 |
| 54 | (18) | 830 | 97 | 0.5 | 4 |
| 55 | (19) | 810 | 97 | 0.5 | 2 |
| 56 | (20) | 810 | 98 | 0.5 | 2 |
| 57 | (21) | 800 | 96 | 0.7 | 5 |

When the electrophotographic photoreceptors obtained in the above Examples were used for making at least 10,000 copies each, there were only differences by less than 2% between the electrophotographic characteristics such as surface potential and sensitivity found and the image density found before making the 10,000 copies and those found after making the 10,000 copies. It is therefore seen that the electrophotographic photoreceptor of the present invention has stable electrophotographic characteristics and continues to give high quality images.

As explained above, according to the present invention, there can be obtained compounds having excellent hole-transporting capability. The compounds provided by the present invention enable the production of an organic EL device having higher light emission efficiency, a higher brightness and a longer life than conventional organic EL devices and also enables the production of an electrophotographic photoreceptor which is excellent in initial electrophotographic characteristics such as sensitivity, hole-transporting capability, an initial surface potential and a dark attenuation ratio and free of fatigue in repeated use.

What is claimed is:

1. A hole-transporting material of the following general formula [1],

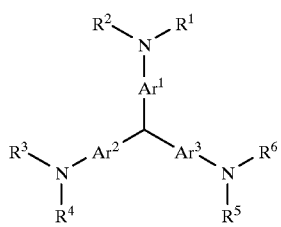

[1]

wherein each of $R^1$ to $R^6$ is an aryl group or a substituted aryl group, provided that at least one of $R^1$ to $R^6$ is an aryl group having a cycloalkyl ring or that at least one of $R^1$ to $R^6$ constitutes fused aromatic rings having not less than 3 fused rings, and each of $Ar^1$ to $Ar^3$ is an arylene group or a substituted arylene group.

2. A hole-transporting material according to claim 1, wherein each of $R^1$, $R^3$ and $R^5$ in the general formula [1] is an aryl group having a cycloalkyl ring.

3. A hole-transporting material according to claim 1, wherein the aryl group having a cycloalkyl group is a tetrahydroxynaphthalene group which may have a substituent.

4. A hole-transporting material according to claim 1, wherein the hole-transporting material has the general formula [2],

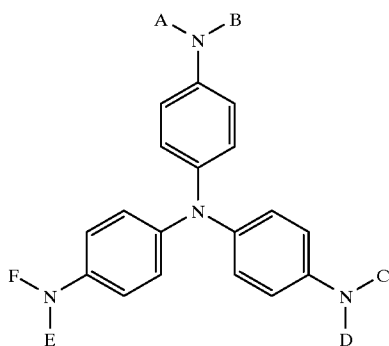

[2]

wherein each of A to F is an aromatic ring or a substituted aromatic ring provided that at least one of A to F constitutes fused aromatic rings having not less than 3 fused rings or a substituted aromatic ring having a cycloalkyl ring.

5. A hole-transporting material according to claim 4, wherein each of A, C and E in the general formula [2] constitutes fused aromatic rings having not less than 3 fused rings or substituted fused aromatic rings.

6. An organic electroluminescence device comprising a pair of electrodes and either a light-emitting layer containing the hole-transporting material recited in claim 1 or a plurality of organic compound layers which contain the light-emitting layer containing the hole-transporting material recited in claim 1, formed between a pair of the electrodes.

7. An organic electroluminescence device according to claim 6, wherein a plurality of the organic compound layers contain the light-emitting layer and a hole-injecting layer containing the hole-transporting material recited in claim 1.

8. An organic electroluminescence device according to claim 6, wherein the light-emitting layer contains the hole-transporting material recited in claim 1.

9. An electrophotographic photoreceptor formed by applying a charge-generating material and a hole-transporting material onto an electrically conductive substrate, wherein the hole-transporting material is the hole-transporting material recited in claim 1.

* * * * *

UNITED STATES PATENT AND TRADEMARK OFFICE
CERTIFICATE OF CORRECTION

PATENT NO.    : 5,968,675
DATED         : October 19, 1999
INVENTOR(S)   : Michiko Tamano et al.

It is certified that error appears in the above-identified patent and that said Letters Patent is hereby corrected as shown below:

Column 3,
Lines 16-25, the formula should read:

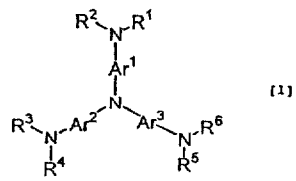

Claim 1,
Line 3 (counting the formula as one line) the formula should read:

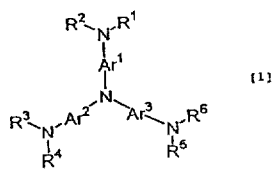

Signed and Sealed this

Twenty-first Day of August, 2001

Attest:

NICHOLAS P. GODICI
Attesting Officer    Acting Director of the United States Patent and Trademark Office